Feb. 1, 1955  W. A. GOOD ET AL  2,700,888
SIMULATOR FOR PREDICTING THE BEHAVIOR OF
A ROLL-STABILIZED VEHICLE IN FLIGHT
Filed April 27, 1948  2 Sheets-Sheet 1
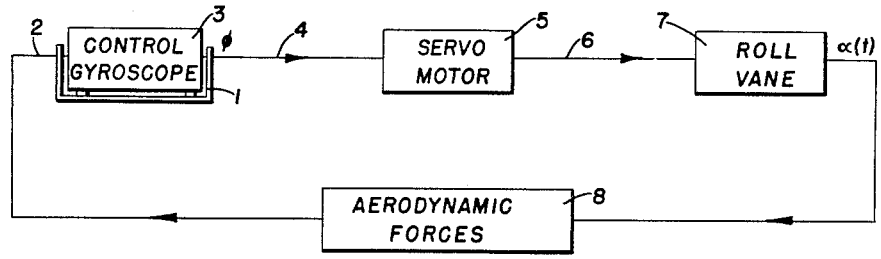
FIG. 1
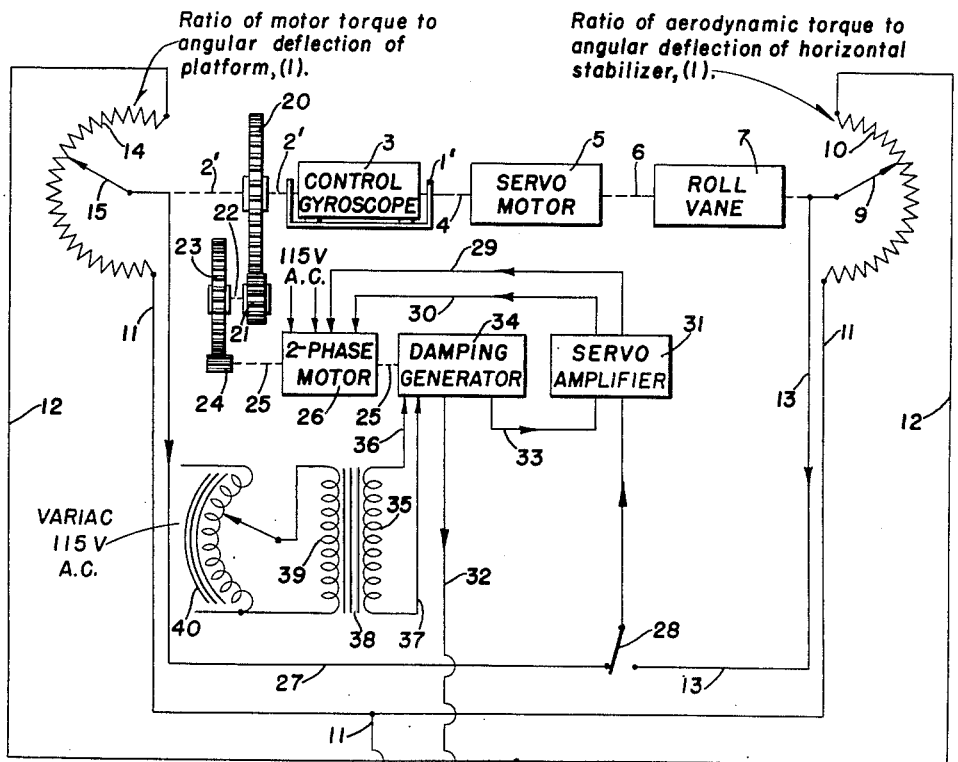
FIG. 2
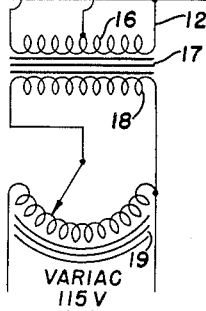
INVENTORS:
WALTER A. GOOD
NORMAN P. HEYDENBURG
BY *S. D. O'Brien*
ATTORNEY

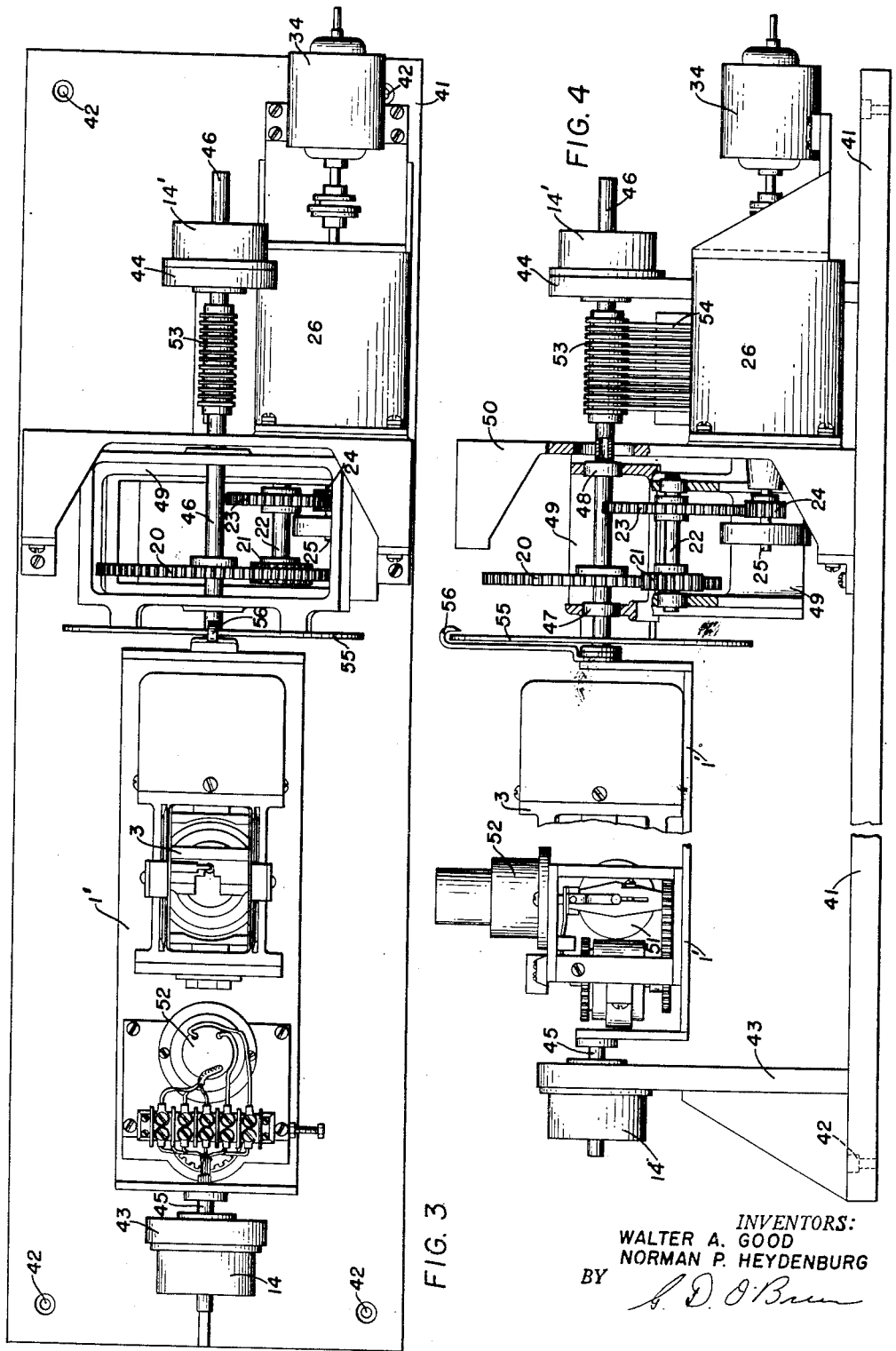

United States Patent Office 2,700,888
Patented Feb. 1, 1955

2,700,888

SIMULATOR FOR PREDICTING THE BEHAVIOR OF A ROLL-STABILIZED VEHICLE IN FLIGHT

Walter A. Good, Silver Spring, and Norman P. Heydenburg, Kensington, Md., assignors to the United States of America as represented by the Secretary of the Navy Application April 27, 1948, Serial No. 23,476

5 Claims. (Cl. 73—1)

The present invention relates to a simulator for predicting the behavior of a roll-stabilized vehicle in flight. More particularly, the invention relates to a simulator which represents a roll-stabilized vehicle in operation, such as a guided missile, and which gives an indication of the character and speed of the response of such vehicle, in its automatic effort to correct any given erroneous orientation.

More specifically, the device has been designed to simulate the action of a roll-stabilized guided missile, wherein the inertia, damping, and forcing-function of the roll-control vane, used as a stabilizer, are known.

An object of the invention is to provide a testing machine of this type, that will afford information concerning the flight characteristics of a guided missile, which is designed to be roll-stabilized, by subjecting the stabilizing means of such a missile to intentional errors of direction, in order to determine the sense and magnitude of the stabilizing effort called forth thereby, all without requiring actual flight of such missile.

A further object is to provide a machine and process for ground-testing roll-stabilized vehicles.

Structurally, the simulator consists of a rolling platform, which supports the roll-stabilizing components, usually including a gyroscope or other control device, of the type used in the missile, and a servo which in turn controls a roll vane setting. The roll-stabilization system of the missile is coupled into the simulator to form a closed loop.

The stability of the platform, and thus inferentially that of the missile, is tested by imparting thereto an initial angular displacement, and observing the behavior of the system in restoring the correct position.

A clear understanding of the invention may be had from the present description of a preferred embodiment thereof, in connection with the accompanying drawing wherein:

Fig. 1 is a simplified block diagram of a generalized roll control system for a missile;

Fig. 2 is a detailed diagrammatic representation of the roll simulator of the present invention;

Fig. 3 is a plan of the simulator; and

Fig. 4 is a corresponding side elevation, with an intermediate portion broken away.

In determining the flight characteristics of guided missiles, it would be extremely tedious and expensive to make actual flight tests, because each such test means the complete destruction or loss of a costly missile. Therefore, it is highly desirable to provide means whereby ground tests may be substituted for flight tests, because thus the desired information may be obtained rapidly and without destruction or loss of the vehicle under test. In order to make such ground tests it is requisite that a device be constructed that will simulate the characteristics of the missile, preferably one that has built-in controls and adjustments, so that a single simulator may represent correctly a wide range of missiles. Such simulator forms the substance of the present invention. For ease of understanding, the invention will first be explained by discussing the block diagrams, Figs. 1 and 2.

Referring first to Fig. 1, the roll control system comprises a platform 1, representing a missile airframe and which under flight conditions rolls about the axis 2, corresponding to a missile's longitudinal axis. The control gyroscope 3 is supported by the platform, and when tilted out of its neutral position, say horizontal, generates a signal which is a function of the angle $\phi$ through which the gyroscope has been turned.

This signal, usually electrical in nature, is transmitted to the servo-motor 5 through the channel 4. This motor 5, which can produce a powerful mechanical effort in response to a relatively weak signal, supplies a mechanical impulse through connection 6 to the roll-controlling vane 7.

The vane 7, as a result of the mechanical shift, generates aerodynamic forces as indicated at 8, which tend to restore the platform 1 to its neutral position.

The equation of the forces acting upon a stabilized guided missile having control wings may be written:

$$I\ddot{\phi} + G\dot{\phi} + H\alpha(t) = T \tag{1}$$

wherein $\phi$ designates the angular displacement about the roll axis, the dotted symbols designating the successive derivatives, $\alpha(t)$ is the angle of the vane away from its neutral position as a function of time, I is the moment of inertia of the missile about the roll axis, G is the coefficient of damping due to the wings, H is the roll torque produced per unit of control-vane angle, also called the "stiffness," and T is the roll torque due to wing misalinement.

In any practical servo mechanism, the output lags the input. For this reason the term $H\alpha(t)$ of Equation 1 representing the restoring torque has been expressed as a function of time. Ideally, an amount of vane angle $\alpha$ proportional to the roll angle $\phi$ would be instantaneously obtained. In such a case, $\alpha(t) = K\phi$. Therefore, assuming that T is zero, the original Equation 1 may be re-written:

$$\ddot{\phi} + a\dot{\phi} + b\phi = 0 \tag{2}$$

wherein $a = G/I$ and $b = Hk/I$. The constants $a$ and $b$ may be determined from the aerodynamics of the missile.

In the present invention, a motor with controllable damping and sensitivity characteristics are provided as the electromechanical analogues of the aerodynamic forces acting upon the actual missile. A switch is provided for selecting the input to the motor whereby the position of the motor armature will represent a solution to either Equation 1 or Equation 2, as desired. The former equation represents the response of a missile having a practically realizable roll control system and the latter equation represents the response of a missile having an ideal roll control system.

Referring now to Fig. 2, with the above brief summary as a background, it will be seen that the structure here shown in analogous to that of Fig. 1. The platform 1' is supported by shaft 2', on which is a gear 20 with a relatively large number of teeth. This meshes with pinion 21 on shaft 22, which also carries a large gear 23, that meshes with pinion 24 on the shaft 25 of motor 26. Suitably, the gear teeth may be so proportioned that the speed of the motor shaft 25 is 18 times that of shaft 2.

As before, when the platform 1' is displaced from its neutral position, the gyroscope 3 transmits a signal through connection 4 to the servo motor 5, which turns the vane 7 through the mechanical connection 6. The vane 7 has a mechanical connection with the contact 9 that moves along potentiometer 10 as shown.

At the other side of Fig. 2 is shown another potentiometer 14, along which moves the contact 15, which is mechanically connected to shaft 2. The two potentiometers 10 and 14 are fed in parallel, through conductors 11 and 12, with alternating current of suitable voltage from the secondary winding 16 of the transformer 17, the primary winding 18 of which is supplied from an adjustable source, such as the Variac 19. It should be noted that when the contacts 9 and 15 are positioned at the midpoint of their respective potentiometers 10 and 14, zero potential difference will exist between the contacts 9 and 15 and conductor 32.

The motor 26 is of the two-phase type and receives power for one phase from the 115 volt A. C. mains, as shown, while the other phase is energized from the output leads 29 and 30 of the servo amplifier 31.

A damping generator 34 is run by the shaft 25. This generator has its field excited by alternating current, from the secondary winding 35 of a transformer 38, through conductors 36 and 37. This transformer is supplied from the 115 volt mains through the Variac 40, which energizes its primary winding 39.

The output side of damping generator 34 is connected to the input side of amplifier 31 by lead 33, and to the center tap of winding 16 by lead 32, and thus is connected to the potentiometers 10 and 14. The input circuit of the amplifier is completed by the switch 28, which may be used to connect either contact 9 or contact 15 to the amplifier, through leads 13 and 27, respectively. Thus the output of the damping generator is always in series with the input of the amplifier, and in such direction as to oppose the outputs received from contacts 9 and 15.

The amplifier 31 will provide energy to motor 26 whenever an input voltage is supplied, and while details thereof are not shown, it will be understood that conventional means are provided for phasing the amplifier output properly, to be 90° out of phase, one way or the other, with the energy supplied to the other winding of motor 26.

The damping voltage supplied by generator 34 always opposes the voltage derived from the transformer 17, and moreover is proportional to the speed of motor 26, hence is greatest when said motor is turning fastest.

The output of motor 26 is first adjusted so that the position of shaft 2' represents a solution to Equation 2. Switch 28 is thrown to contact lead 27 so that the input to amplifier 31 depends upon the position $\phi$ of the platform 1' and the voltage applied to potentiometer 14. Variac 40 is set at zero so that the output of the damping generator 34 is zero. Platform 1' is then tilted away from its neutral position which corresponds to the mid-position of potentiometer 14. When released, platform 1' will oscillate at a frequency determined by the setting of Variac 19. Accordingly, Variac 19 is adjusted to provide a frequency $f$ of oscillation, $$f = \frac{\sqrt{b}}{2\pi}$$

Variac 40 is then advanced, providing damping until the amplitude between each successive peak of oscillation decreases in the ratio $\epsilon^{-(a\pi/\sqrt{b})}$. The constants $a$ and $b$ are those determined from the aerodynamics of the missile as noted hereinbefore, and $\epsilon$ is the base of natural logarithms.

Having completed the above adjustments, the position of platform 1' will represent a solution to Equation 2. The solution of Equation 1 is conveniently accomplished by throwing switch 28 into contact with lead 13 thereby substituting the voltage appearing at the contact 9 for the voltage appearing at the contact 15 as the input to the amplifier 31. Since the position of contact 9 is determined by the position of the roll vane 7 and includes any time lags or imperfections occurring in the control system, the response of an actual missile in flight can be determined by observing the efforts of the motor 26 to right platform 1' when platform 1' is displaced from its neutral position.

Having disclosed the abstract mechanical and electrical features and the circuits that are involved in the simulator, as shown in Figs. 1 and 2, a description of the structural details of the platform 1' and its motive means will now be given, with particular reference to Figs. 3 and 4.

A base 41, which may have holes 42 for mounting-screws as indicated, serves as a support for the entire device. The platform or cradle 1', for carrying the mechanism to be tested, is mounted on the base 41 by means of brackets 43 and 44 and shafts 45 and 46. Additional support is afforded to shaft 46 by bearings 47 and 48, carried by a frame 49 which itself is secured to a bracket 50.

While, in the block diagrams, for simplicity merely a control gyroscope 3 is indicated on the platform 1', additional apparatus is shown thereon in Figs. 3 and 4, namely, the rate gyroscope 51 and auxiliary devices, such as the pickoff 52. It will be understood that the precise nature of the mechanism mounted on the platform 1' is immaterial, as it is not a permanent part of the assembly but is merely any device, within its capabilities, that is to be subjected to a test. Usually it will include one or more gyroscopes, but it is conceivable that other orientation-responsive means, for example, a magnetic compass or the like, would in some cases be mounted on the platform for testing.

The potentiometer 14 is illustrated, corresponding to the element designated by the same reference numeral in Fig. 2, and the two-phase motor 26 and damping generator 34 likewise correspond to the similarly designated components of the block diagrams. An alternate potentiometer 14' forms a pickoff to permit the use of a recording oscillograph thereby providing a permanent record of the movements of the platform 1'.

At 53 are shown slip rings, mounted on the hollow shaft 46, which coact with a like number of contact fingers 54. These serve to provide electrical connections to the apparatus under test, wires leading from said apparatus to said slip rings conveniently being accommodated within the bore of shaft 46.

Suitable gearing is shown, connecting shaft 46 to motor 26. This comprises gears 20, 21, 23 and 24 and shaft 22, likewise shown in Fig. 2, diagrammatically. A circular scale 55 is mounted on frame 49, and a pointer 56, attached to platform 1', moves along said scale to indicate the angular position of the said platform.

By use of this simulator it becomes possible to determine how the device under test would behave if it were built into an actual flying missile, without requiring flight thereof. This is possible because the various circuit components may be so adjusted that the assembly will give an accurate picture of what would happen in actual flight, for example, how much aerodynamic restoring effort would be produced upon deliberately setting the platform at an erroneous, non-level, position. By means of the circular scale 55 and the pointer 56 the "error angle" may be found directly. When the platform is released, it returns to the level or "zero" position. This should occur without oscillation and as rapidly as possible. By making changes in the settings of components, and noting the effects of such changes on the response produced, it becomes possible to determine the optimum settings of the missile control elements, without flight-test thereof.

In order to adjust the simulator itself to represent the characteristics of the flying missile, use is made of the two Variacs, 19 and 40. The former adjusts the voltage applied to the potentiometers, while the latter controls the excitation of the damping generator.

By reason of the fact that the output of potentiometer 14 provides the input signal of the servo amplifier 31, which in turn after amplification controls the torque produced by the motor 26, said potentiometer 14 determines the ratio of the torque applied to shaft 2 to the deflection in degrees of said shaft, known as the "stiffness."

The potentiometer 10, on the other hand, when substituted in the input circuit of the servo amplifier 31 by throwing switch 28 to the right, will control similarly the ratio of the aerodynamic torque produced by the stabilizer 7, to the angle in degrees through which said stabilizer is turned, that is, the corresponding aerodynamic "stiffness."

Thus, from known aerodynamic characteristics of the missile, the simulator may be calibrated to equate these two differently-derived representations of stiffness.

While the form of the invention at present preferred has been disclosed in detail, together with certain circuits, apparatus and procedures that may be used in practicing the invention, it should be understood clearly that such disclosure is to be considered solely in an illustrative sense, and in no way as a limitation of the invention, which obviously may be embodied in various other forms. The scope of the invention is therefore defined solely in and by the following claims.

What is claimed is:

1. A roll control simulator for testing a roll stabilization system for an aerial vehicle, said system providing movement of an aerodynamic vane in response to the output of a sensing device for detecting the roll angle $\phi$, comprising means for imparting motion to said sensing device, said motion being characterized by the equation $\ddot{\phi} + a\dot{\phi} + b\phi = 0$ wherein the coefficients of $a$ and $b$ represent inherent qualities of said vehicle, and means responsive to the movement of said aerodynamic vane for initiating the motion of said first-named means.

2. Apparatus for testing a roll control system, said system providing movement of an aerodynamic vane in response to the output of a sensing element, comprising a pivotally mounted support for said sensing element, means for quantitatively detecting responsive movements of said vane arising upon displacement of said support, and means controllable by said detecting means for altering the position of said support.

3. A roll simulator for indicating the probable response of an aerial vehicle to roll inducing torques, said vehicle having automatic means for generating torques counteracting with roll inducing torques, comprising means inducing corrective efforts of said aerial vehicle and providing an analogue T representing the magnitude of a roll inducing torque, means for detecting said corrective efforts and providing a quantity of voltage Hα(t) representing said counteracting torques, means indicating the simulated roll angle φ, means providing a voltage Gφ̇ analogous to the aerodynamic drag experienced by a similar vehicle in flight, means representing the inertial qualities I of said aerial vehicle, and means combining said roll inducing analogue T, said corrective analogue Hα(t), said aerodynamic drag analogue Gφ̇ and said representation of the inertia I to provide a solution to the equation $$I\ddot{\phi}+G\dot{\phi}+H\alpha(t)=T$$

4. A roll simulator for duplicating the motion of a roll stabilized aerial vehicle in flight, comprising a pivotally mounted platform, a sensing element mounted on said platform providing an output proportional to the displacement of said platform about its axis, a servo mechanism to receive the output of said sensing element, a vane positioned by said servo mechanism in accordance with the output of said sensing element, means providing a voltage proportional to the position of said vane, means for varying the factor of proportionality of said voltage and vane position, a second servo mechanism to position said platform in a manner simulating a vehicle in flight, said second servo mechanism including a motor, a damping generator connected to said motor and an amplifier controlling the direction and magnitude of the torque output of said motor according to the sum of the output of said damping generator and said position voltage, and means for varying the output of said damping generator.

5. A roll simulator for duplicating the motion of a roll stabilized aerial vehicle in flight, comprising a pivotally mounted platform, a sensing element mounted on said platform providing an output proportional to the displacement of said platform about its axis, a servo mechanism to receive the output of said sensing element, a vane positioned by said servo mechanism in accordance with the output of said sensing element, means providing a voltage proportional to the position of said vane, means for varying the factor of proportionality of said voltage and vane position, a second servo mechanism to position said platform in a manner simulating a vehicle in flight, said second servo mechanism including a motor, a damping generator connected to said motor and an amplifier controlling the direction and magnitude of the torque output of said motor according to the sum of the output of said damping generator and said position voltage, means for varying the output of said damping generator, and means for indicating the magnitude of inclination of said pivotally mounted platform.

References Cited in the file of this patent

UNITED STATES PATENTS

| | | |
|---|---|---|
| 1,679,354 | Fairchild et al. | Aug. 7, 1928 |
| 2,014,825 | Watson | Sept. 17, 1935 |
| 2,115,086 | Riggs | Apr. 26, 1938 |
| 2,366,266 | Kallenbach | Jan. 2, 1945 |
| 2,478,956 | Webber | Aug. 16, 1949 |
| 2,492,244 | Shivers | Dec. 27, 1949 |
| 2,495,591 | Meredith | Jan. 24, 1950 |
| 2,592,417 | Hale | Apr. 8, 1952 |

FOREIGN PATENTS

| | | |
|---|---|---|
| 558,374 | Great Britain | Dec. 3, 1944 |